US008854659B2

(12) United States Patent
Koike

(10) Patent No.: US 8,854,659 B2
(45) Date of Patent: Oct. 7, 2014

(54) IMAGE PROCESSING APPARATUS CONTROLLING EXECUTION OF A JOB WITHOUT INTERVENTION OF A WEB SERVER, CONTROL METHOD THEREOF, AND STORAGE MEDIUM STORING A PROGRAM THEREFORE

(75) Inventor: Hiroaki Koike, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 13/118,892

(22) Filed: May 31, 2011

(65) Prior Publication Data

US 2011/0310429 A1 Dec. 22, 2011

(30) Foreign Application Priority Data

Jun. 17, 2010 (JP) .................................. 2010-138645
May 19, 2011 (JP) ................................. 2011-112900

(51) Int. Cl.
  *G06F 3/12* (2006.01)
  *H04N 1/32* (2006.01)
  *H04N 1/00* (2006.01)

(52) U.S. Cl.
  CPC ....... *H04N 1/00464* (2013.01); *H04N 1/32651* (2013.01); *H04N 1/326418* (2013.01); *H04N 2201/0094* (2013.01); *H04N 1/00244* (2013.01); *H04N 1/00477* (2013.01); *H04N 1/32614* (2013.01); *H04N 1/00915* (2013.01); *H04N 2201/0039* (2013.01)
  USPC ....................................................... 358/1.15

(58) Field of Classification Search
  None
  See application file for complete search history.

(56) References Cited

U.S. PATENT DOCUMENTS

| 8,310,703 B2* | 11/2012 | Nuggehalli et al. ......... 358/1.15 |
| 8,316,423 B2* | 11/2012 | Nishimi ............................ 726/5 |
| 2006/0050301 A1* | 3/2006 | Satomi ......................... 358/1.15 |
| 2009/0225366 A1* | 9/2009 | Emori .......................... 358/1.15 |

FOREIGN PATENT DOCUMENTS

| CN | 101533339 A | 9/2009 |
| JP | 2006-203869 A | 8/2006 |
| JP | 2008-003833 A | 1/2008 |

OTHER PUBLICATIONS

Office Action—Chinese Patent Appln. No. 201110168500.2 dated Aug. 1, 2013, Chinese Patent Office.

* cited by examiner

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

An image processing apparatus of the present invention includes a display control unit that displays an operation screen based on screen information provided from a Web server, and transmits input information for the operation screen to the Web server, and an execution control unit that executes a job according to an execution request received from the Web server. The execution control unit, when starting execution of the job, notifies the Web server of a corresponding job ID. The display control unit displays, based on screen information received from the Web server together with the job ID, an operation screen related to the job which is being executed. When an instruction related to the job is input via the operation screen, the display control unit, upon determining that a predetermined condition is satisfied, instructs the execution control unit to control execution of the job without the intervention of the Web server.

10 Claims, 13 Drawing Sheets

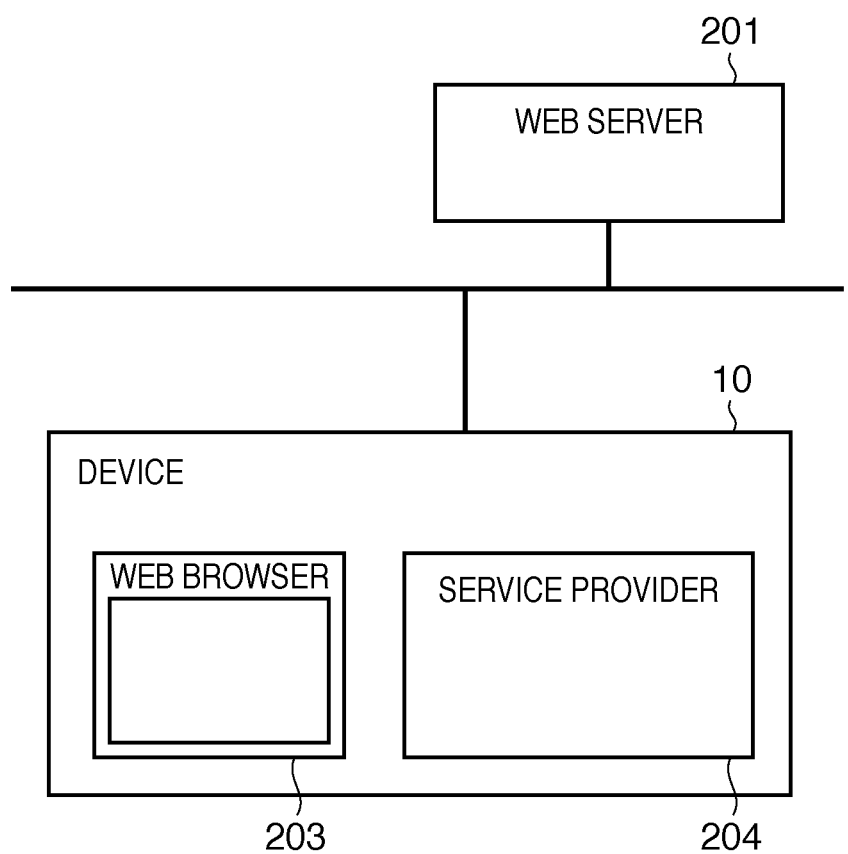

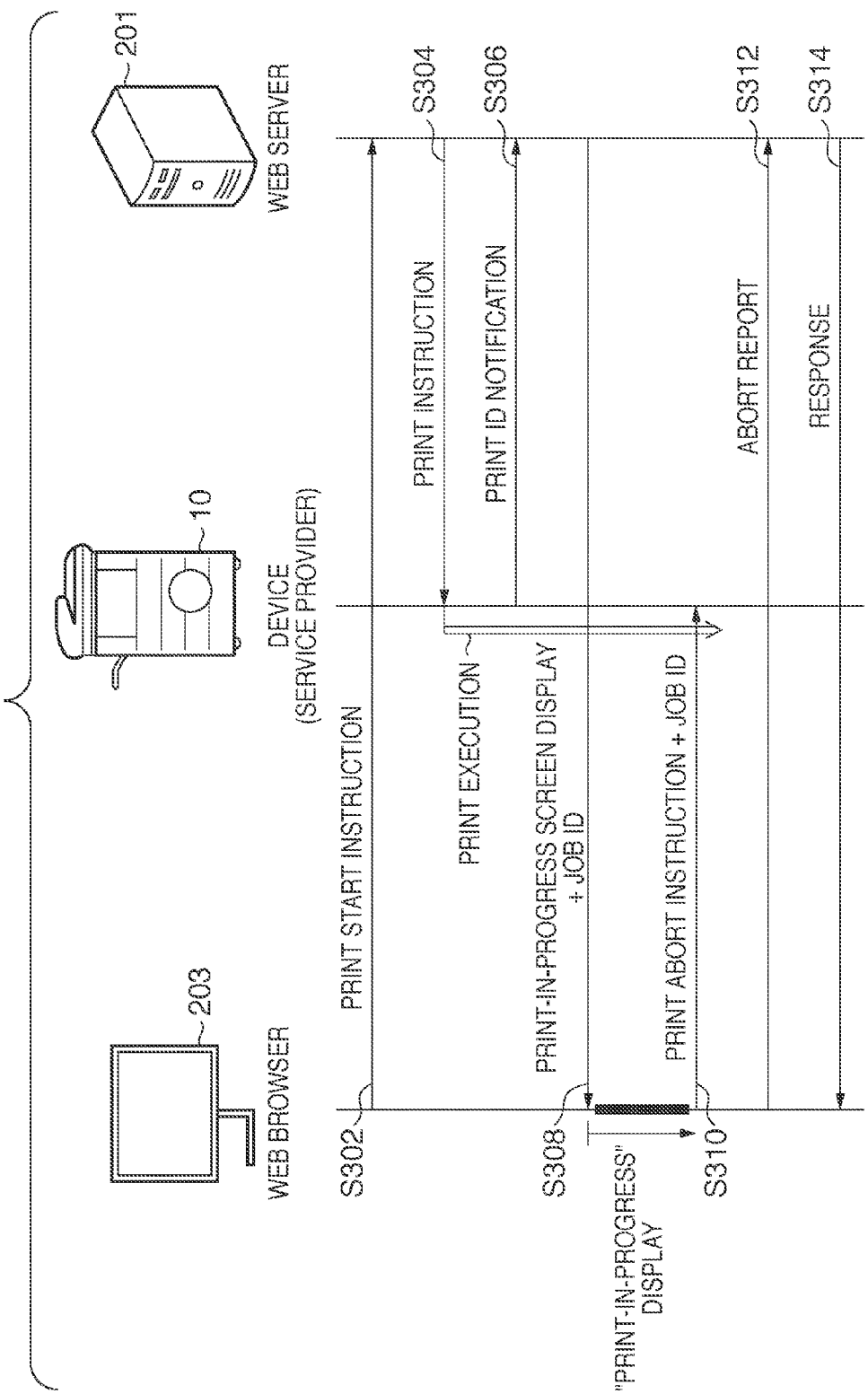

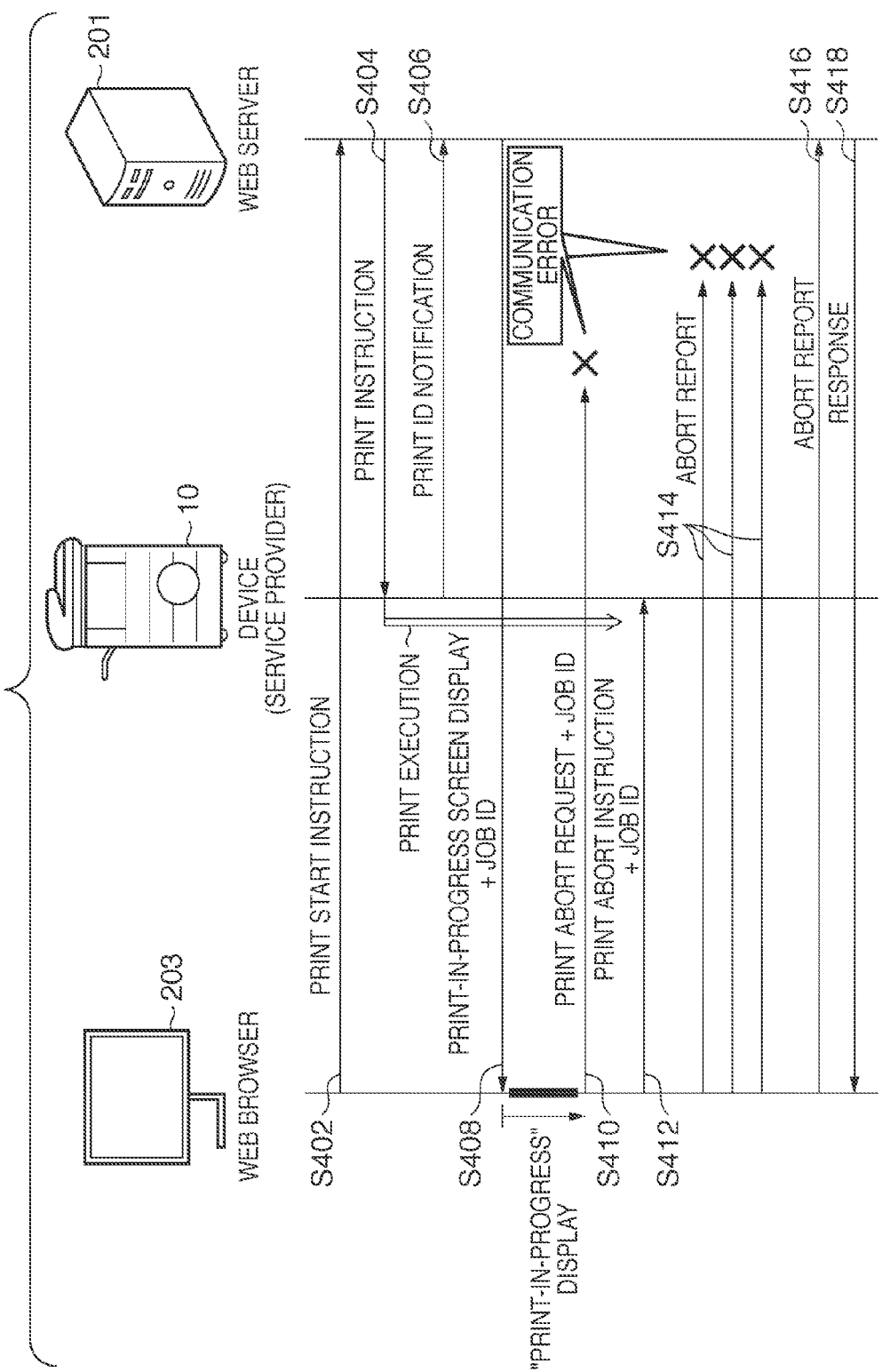

FIG. 6A

```
SCRIPT INTERPRETER
<html>
<body>
<script type = "text / javascript">
window.onlead_function(){
    var btn = document.getElementById("stop");
    if(btn.addEventListener){
        btn.addEventListener("click",Stop.false);
    }else{
        btn.attachEvent("onclick",Stop);
    }
}
function Stop(){
    device.printer.JobStop(jid);    //(F2)JOB ABORT PROCESSING
    report();    //(F4)ABORT REPORT PAGE TRANSFER PROCESSING
}
</script>
<input type = "button" id="stop" value = "ABORT">
...
</body>
</html>
```

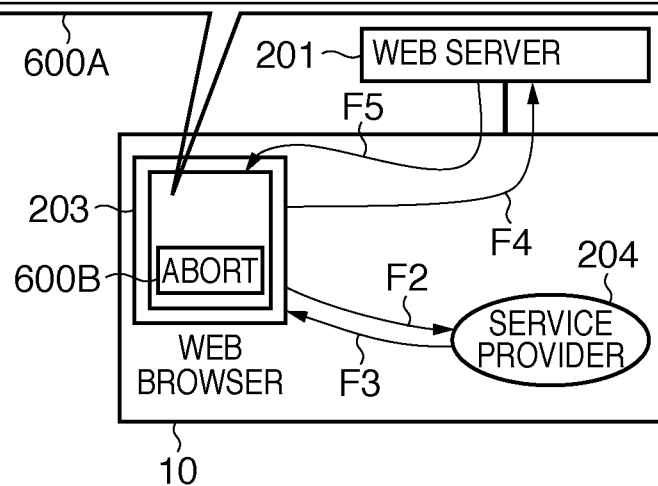

FIG. 7A

```
<!DOCTYPE HTML PUBLIC "-//W3C//DTD HTML 4.01 Transitional//EN"
...
<html xmlns = "http://www.w3.org/1999/xhtml">
    <head>
            ...
            <script type_"text/javascript>
                var btn:
                function funcload(){
                    if (window.XML.HttpRequest){
                        btn = new XML.HttpRequest ()};
                    }eise{
                    if (window.ActiveXObject){
                            btn = new ActiveXObject("Microsoft.XMLHTTP");
                    }eise{
                            btn - null;
                    }
                    btn.onreadystatechange = check:
                    btn.open("GET"."~.cgi".true) ;
                    btn.send(null);
                    }
                function check(){
                    if (btn.readyState = 4 && xmlHttp status == 200){
                        report();
                    }
                }
            </script>
    </head>
    <body>
    ...
        <input type = "button" id = "stop" value = "ABORT" onClick = "functoad()">
    </body>
</html>
```

```
<html>
<head>
...
<script type = "text/javascript">
    ...
    btn.orreadystatechenge=check;
    btn.open("GET", "hthp://127.0.0.1/JobStop.cgi?jid=J1001",true);   //JOB ABORT PROCESSING
    btn.send(null))
    function check(){
        if (btn.readyState==4&& xmlHttp.status==200){
            report();   //FOR ABORT REPORTING
        }
    ...
</script>
</head>
<body>
<input type = "button" id = "stop" value = "ABORT" onClick = "functoad()">
...
</body>
</html>
```

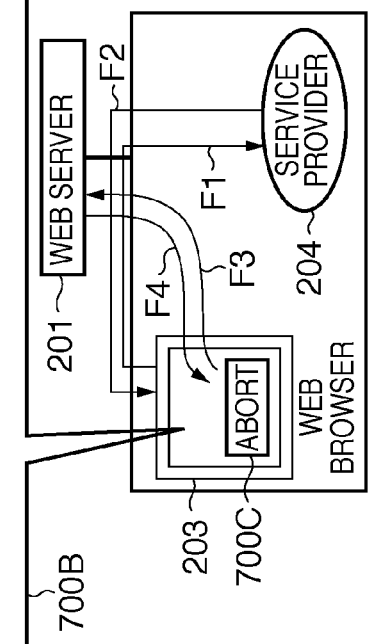

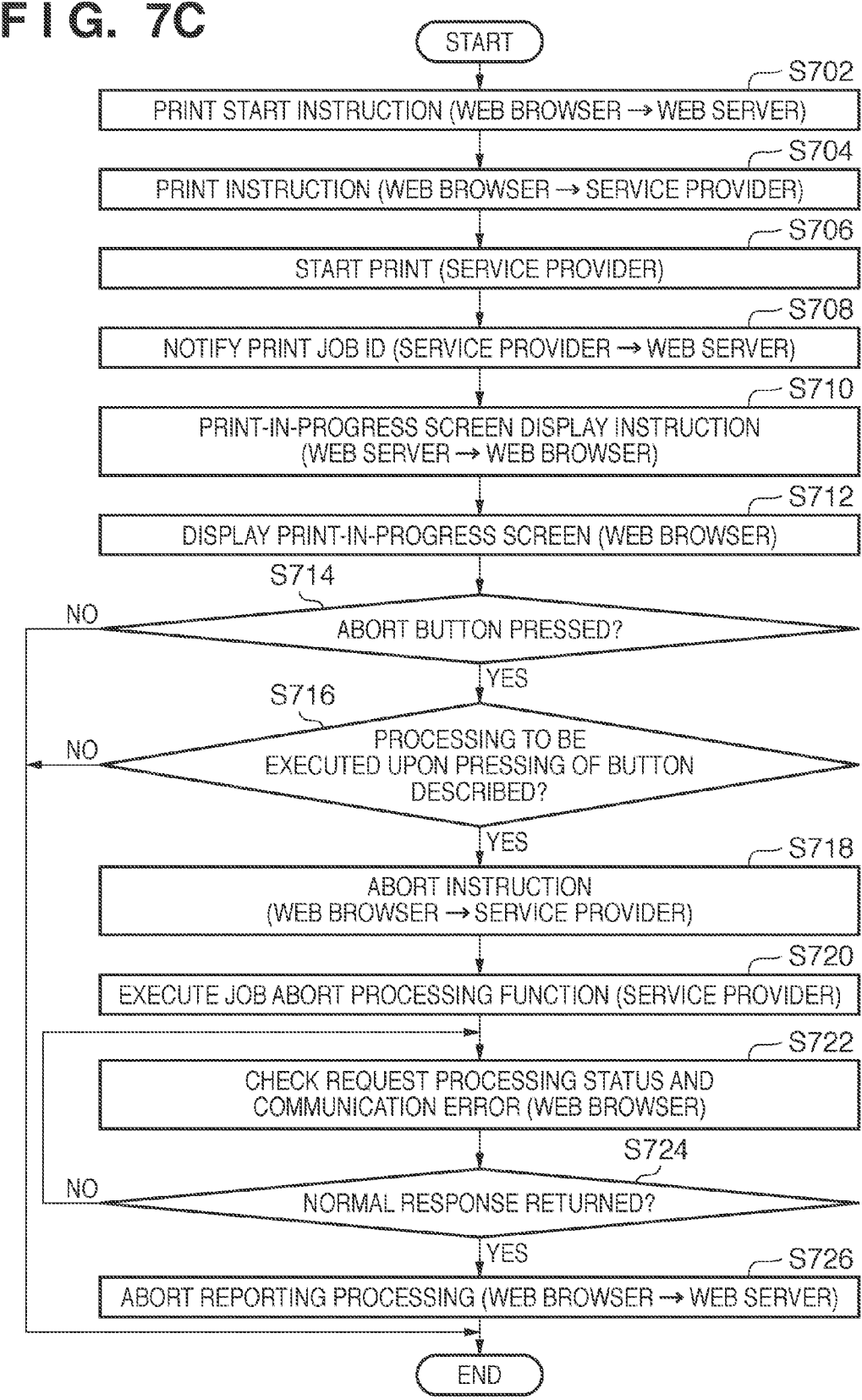

IMAGE PROCESSING APPARATUS CONTROLLING EXECUTION OF A JOB WITHOUT INTERVENTION OF A WEB SERVER, CONTROL METHOD THEREOF, AND STORAGE MEDIUM STORING A PROGRAM THEREFORE

BACKGROUND OF THE INVENTION

1. Field of the Invention

The present invention relates to an image processing apparatus which updates a screen via a Web server, a control method thereof, and a storage medium.

2. Description of the Related Art

An image processing apparatus has a plurality of functions such as copying, printing, and facsimile functions, and activates one of these functions by selectively using applications corresponding to these functions. In recent years, an operation panel of such an image processing apparatus has been installed with a Web browser. For example, Japanese Patent Laid-Open No. 2006-203869 has proposed that a Web page required to operate the image processing apparatus is provided from a Web server connected via a network, and the Web browser displays this Web page to allow the user to operate the image processing apparatus.

Also, Japanese Patent Laid-Open No. 2008-003833 has proposed, as a method of reducing a communication load on a network between the image processing apparatus and Web server, a method in which the image processing apparatus acquires screen display format data including a screen flow control script from the server side and executes this script.

In general, a system including the image processing apparatus and Web server is configured to execute processes corresponding to respective operations of the image processing apparatus via the Web server as much as possible. This is because the many steps required for installation and updating of embedded applications in each individual image processing apparatus can be avoided by installing an entity of image processing in the Web server. Also, centralized management of logs of processes corresponding to operations of individual image processing apparatuses on the Web server can be facilitated. However, there is also a demand for the execution of processing that requires immediacy by each individual image processing apparatus without the intervention of the Web server as much as possible. For example, during execution of a job based on an instruction from the Web server, when processing for aborting the job, as the processing that requires immediacy, is executed via the Web server, a long time is taken before the job is aborted.

SUMMARY OF THE INVENTION

The present invention provides a technique which controls execution of a job without the intervention of a Web server when immediacy is required in an image processing apparatus which executes a job via the Web server.

One aspect of the present invention provides an image processing apparatus configured to communicate with a Web server which provides screen information required to display an operation screen to an image processing apparatus, and transmits an execution request of processing corresponding to input information input via the operation screen to the image processing apparatus, the apparatus comprising: a display control unit that displays an operation screen based on screen information provided from the Web server, and transmits input information input via the operation screen to the Web server; and an execution control unit that executes, upon reception of an execution request corresponding to the input information transmitted from the display control unit to the Web server from the Web server, a job according to the execution request, and comprises a notification unit that notifies the Web server of a job ID used to identify the job when execution of the job is started, the display control unit comprising: a reception unit that receives, from the Web server, screen information of an operation screen related to the job which is being executed together with the job ID in response to notification of the job ID by the notification unit; a determination unit that determines whether or not a predetermined condition is satisfied when an instruction related to the job is input via the operation screen displayed based on the received screen information during execution of the job; and an instruction unit that instructs, without the intervention of the Web server, the execution control unit to control execution of the job corresponding to the job ID in accordance with the input instruction, when the determination unit determines as a result of determination that the predetermined condition is satisfied.

Another aspect of the present invention provides a control method of an image processing apparatus, which is configured to communicate with a Web server which provides screen information required to display an operation screen to an image processing apparatus, and transmits an execution request of processing corresponding to input information input via the operation screen to the image processing apparatus, and comprises a display control unit that displays an operation screen based on screen information provided from the Web server, and transmits input information input via the operation screen to the Web server, and an execution control unit that executes, upon reception of an execution request corresponding to the input information transmitted from the display control unit to the Web server from the Web server, a job according to the execution request, the method comprising: the execution control unit notifying the Web server of a job ID used to identify the job when the execution control unit starts execution of the job; the display control unit receiving, from the Web server, screen information of an operation screen related to the job which is being executed together with the job ID in response to notification of the job ID in the notifying; the display control unit determining whether or not a predetermined condition is satisfied when an instruction related to the job is input via the operation screen displayed based on the received screen information during execution of the job; and the display control unit instructing, without the intervention of the Web server, the execution control unit to control execution of the job corresponding to the job ID in accordance with the input instruction, when it is determined as a result of determination in the determining that the predetermined condition is satisfied.

According to the present invention, when immediacy is required in an image processing apparatus which executes a job via a Web server, execution of that job can be controlled without the intervention of the Web server.

Further features of the present invention will become apparent from the following description of exemplary embodiments (with reference to the attached drawings).

BRIEF DESCRIPTION OF THE DRAWINGS

FIG. 2 is a diagram showing the arrangement of an image processing system according to the first embodiment;

FIG. 3 is a chart showing signal flows among a Web browser 203, service provider 204, and Web server 201;

FIG. 4 is a chart showing signal flows among the Web browser 203, service provider 204, and Web server 201 when a communication cannot be established between the device 10 and Web server 201;

FIGS. 6A and 6B are respectively a view showing an overview of a mechanism for aborting a print job without the intervention of the Web server 201, and a flowchart showing the sequence of operations to be executed, when a DOM is used;

FIGS. 7A, 7B, and 7C are respectively views (scripts 700A and 700B) showing an overview of a mechanism for aborting a print job without the intervention of the Web server 201, and a flowchart showing the sequence of operations to be executed, when an XMLHttpRequest is used.

DESCRIPTION OF THE EMBODIMENTS

<First Embodiment>

Figure 1:
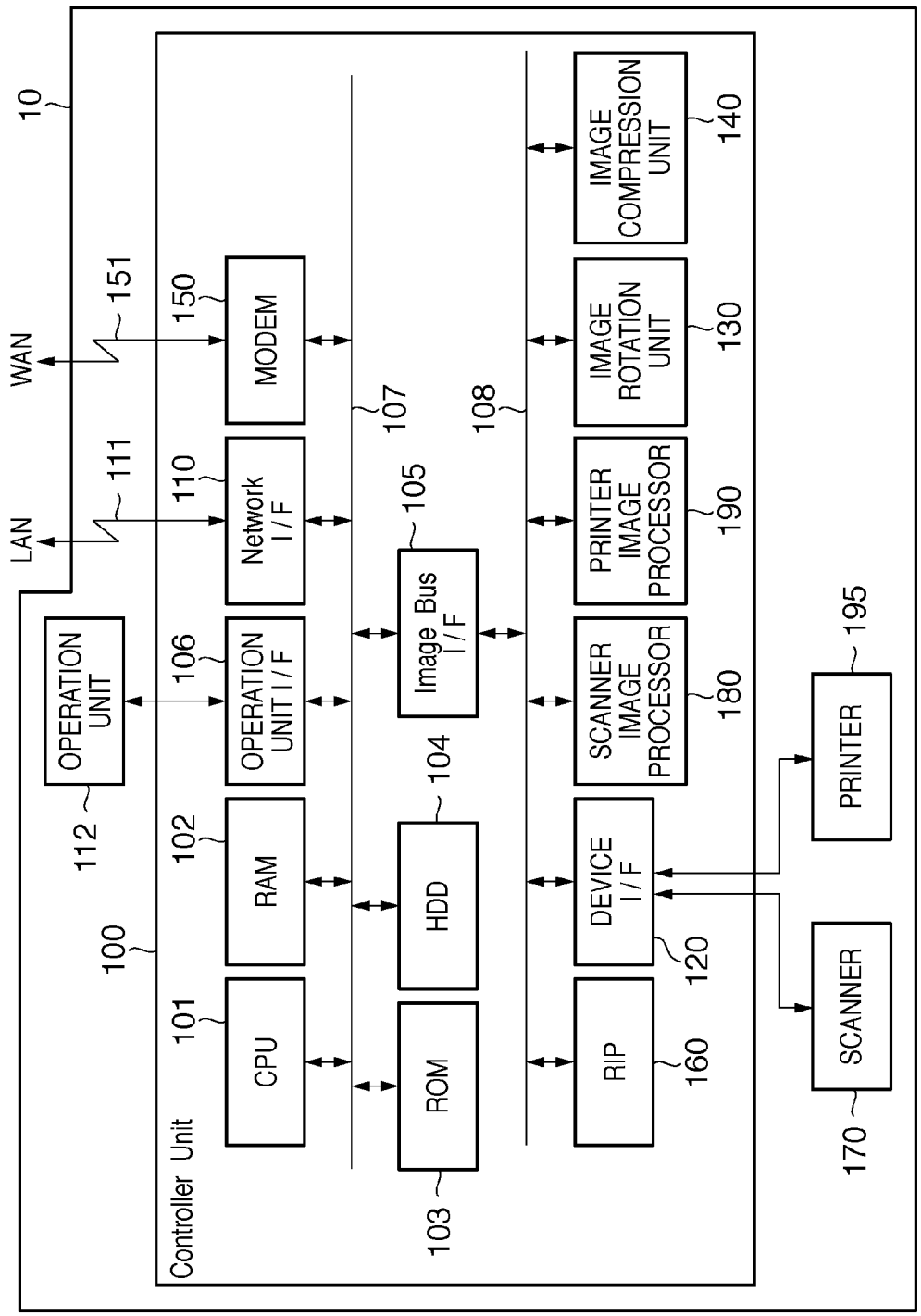
FIG. 1 is a block diagram showing the arrangement of an image processing apparatus (device 10) according to the first embodiment.

FIG. 1 is a block diagram showing the arrangement of a device (image processing apparatus) 10 according to this embodiment. This embodiment will explain, as an example of an image processing apparatus, a device including a digital multi-function apparatus having a copy function, print function, and facsimile function.

As shown in FIG. 1, the device 10 includes a controller unit 100, operation unit 112, scanner 170, and printer 195. The controller unit 100 controls the overall device, and executes control associated with input/output processing of image information and device information. The scanner 170 as an image input device and the printer 195 as an image output device are connected to the controller unit 100. The device 10 is connected to a LAN 111 and public network (WAN) 151 via a network interface (I/F) 110 and MODEM 150, respectively. This device 10 is a digital multi-function apparatus having a copy function, printer function, and communication function such as a facsimile function. The device 10 prints out data externally supplied via the LAN 111 by the printer function. Also, the device 10 executes FAX transmission via the WAN 151 by the communication function.

The controller unit 100 includes a CPU 101, which activates a system based on a boot program stored in a ROM 103. Also, the CPU 101 reads out various control programs stored in an Hard Disk Drive (HDD) 104, maps them on a RAM 102, and executes predetermined processes using the RAM 102 as a work area on the activated system. The HDD 104 or ROM 103 stores various programs required to execute operations inside the controller unit 100, and also stores image data.

The CPU 101 communicates with respective function units via an image bus I/F 105, system bus 107, and image bus 108. The RAM 102 is mainly used to temporarily store data required for processes to be executed by the CPU 101.

An operation unit I/F 106 is an interface between the controller unit 100 (CPU 101) and operation unit 112. The operation unit I/F 106 transfers image data to be displayed on the operation unit 112 to the operation unit 112, and transfers a signal generated by an operation input at the operation unit 112 to the CPU 101. The operation unit 112 has a display unit used to display current setting states of respective functions associated with image formation, and a screen used to input setting information associated with respective functions, and an input unit including keys used to input setting information for respective functions. Note that a Web browser 203 displays an operation screen based on screen information provided from a Web server 201 on the display unit of the operation unit 112, as will be described later.

The network I/F 110 is connected to the LAN 111, and inputs/outputs information via the LAN 111. The MODEM 150 is connected to the public network (WAN) 151, and inputs/outputs information via the public network 151. The image bus I/F 105 is an interface which connects the image bus 108 and system bus 107, and includes a bus bridge which converts the data structure of data to be exchanged via the interface.

The image bus 108 is configured by a PCI bus or a bus compliant with the IEEE1394 standard, which can transfer image data at high speed. For example, an RIP (Raster Image Processor) 160, device I/F 120, scanner image processor 180, printer image processor 190, image rotation unit 130, and image compression unit 140 are connected to the image bus 108.

The RIP 160 expands PDL code data into bitmap image data. The device I/F 120 is an interface which connects the scanner 170, printer 195, and controller unit 100, and converts synchronous/asynchronous systems of image data to be exchanged via the interface.

The scanner image processor 180 corrects, modifies, and edits input image data. The printer image processor 190 applies correction and resolution conversion corresponding to the printer to image data to be printed out. The image rotation unit 130 executes rotation processing of image data. The image compression unit 140 applies compression/decompression processing such as JPEG to multi-valued image data, and compression/decompression processing such as JBIG, MMR, or MH to binary image data.

As described above, the CPU 101 of the controller unit 100 systematically controls accesses among various devices connected to the system bus 107 based on respective control programs. For example, when the CPU 101 executes the copy function, it controls to load image information from the scanner 170 via the device I/F 120, to apply predetermined processing to that image information, and then to output the image information to the printer 195 via the device I/F 120.

The controller unit 100 of the device 10 is connected to an information terminal apparatus via an arbitrary communication means such as a LAN or a serial cable. This information terminal apparatus is used to back up, for example, setting data of the device 10. In response to a backup instruction from the information terminal apparatus, setting data in the device 10 is stored in the information terminal apparatus. In response to a restore instruction, the setting data stored in the information terminal apparatus is reflected to the device 10. In this case, an instruction method from the information terminal apparatus to the device 10 is not particularly limited. For example, the device 10 may transmit HTML data required to display an operation screen that allows an instruction to be input to the information terminal apparatus, and a Web browser on the information terminal apparatus side may display the operation screen based on the HTML data. In this case, the information terminal apparatus issues an instruction to the device 10 based on an input via the displayed operation screen. Alternatively, the information terminal apparatus may issue an instruction to the device 10 using a dedicated application.

FIG. 2 is a diagram showing the arrangement of a system according to this embodiment. A Web server 201 and the device (image processing apparatus) 10 are connected so as to be able to communicate with each other via at least one of a LAN and WAN. The device 10 includes the controller unit 100, operation unit 112, scanner 170, and printer 195 shown in FIG. 1. The device 10 further includes a device embedded Web browser 203 and a service provider 204 which executes processes required to implement functions included in the device 10. The Web browser 203 executes display control that requests the Web server 201 to send screen information of an operation screen to be displayed on (the display unit of) the operation unit 112, and displays an operation screen based on the screen information such as an HTML file received from the Web server 201 on the operation unit 112. Note that the Web browser 203 and service provider 204 are respectively examples of a display control unit and execution control unit.

The Web browser 203 transmits (notifies) an instruction (input information) input by the user via the displayed operation screen to the Web server 201. Upon reception of the instruction from the Web browser 203, the Web server 201 transmits screen information of an operation screen corresponding to the instruction to the Web browser 203. In this case, when the Web server 201 requires the device 10 to execute processing corresponding to the received instruction, it transmits an execution request of the processing corresponding to the instruction to the service provider 204 in the device 10. Upon reception of the execution request from the Web server 201, the service provider 204 generates a job including processing according to the execution request, and executes the generated job. Furthermore, the service provider 204 transmits an execution result of the processing to the Web server 201.

FIG. 3 is a chart showing signal flows among the Web browser 203, the service provider 204 in the device 10, and the Web server 201. When the user makes a print start operation via the operation screen displayed by the Web browser 203 in step S302, the Web browser 203 transmits, to the Web server 201 as input information via the operation screen, a print start instruction indicating that the user instructs to start print processing.

Upon reception of the print start instruction from the Web browser 203, the Web server 201 transmits a print execution instruction (to be referred to as "print instruction" hereinafter) corresponding to a print execution request to the service provider 204 of the device 10 in step S304. In this way, the Web server 201 transmits the execution request of processing corresponding to the input information via the operation screen displayed by the Web browser 203 to the service provider 204. In response to this instruction, the service provider 204 generates a job (print job) according to the print instruction, and starts execution of the generated job. Upon starting execution of the job, the service provider 204 issues a job ID used to identify that job and notifies the Web server 201 of the issued job ID in step S306.

Upon reception of the notified job ID, the Web server 201 transmits screen information required to display a "print-in-progress screen" including information of the job ID to the Web browser 203 in step S308. In this case, the print-in-progress screen is a screen which displays that print processing is being executed, that is, an example of an operation screen related to the job which is being executed. Upon reception of the screen information of the print-in-progress screen, the Web browser 203 displays the print-in-progress screen based on the received screen information during execution of the print processing. Note that this print-in-progress screen includes an "abort" button which allows the user to instruct to abort execution of the print job.

When the user presses the "abort" button in step S310 while the print-in-progress screen is displayed, the Web browser 203 executes processing to be described below.

When the print abort instruction is input, the print job which is being executed has to be immediately aborted in general. That is, the print abort instruction is an instruction related to processing to be executed immediately, and corresponds to an example of a specific instruction associated with processing determined in advance as processing to be executed immediately (which requires immediacy). When the device 10 notifies the Web server 201 of such instruction, and receives an execution request corresponding to that instruction from the Web server 201, the time period required until the service provider 204 executes processing according to the instruction may be unwantedly prolonged due to, for example, a network delay.

Hence, in the embodiment shown in FIG. 3, when the user inputs an instruction related to a job via the operation screen during execution of the job, the Web browser 203 determines whether or not the instruction is a specific instruction related to the job which is being executed, that is, an instruction to be executed immediately. Furthermore, in response to the determination result indicating that the instruction is an instruction to be executed immediately, the Web browser 203 notifies the service provider 204 of that instruction without notifying the Web server 201 of it. More specifically, the Web browser 203 instructs the service provider 204 to control execution of the job corresponding to the job ID received from the Web server 201 in accordance with the instruction without the intervention of the Web server 201.

In step S310, the Web browser 203 transmits to the service provider 204 the job ID of the job, execution of which is to be aborted, and a print abort instruction. Upon reception of the print abort instruction, the service provider 204 aborts execution of the print-in-progress job corresponding to the job ID.

After the Web browser 203 transmits the print abort instruction to the service provider 204 in step S310, it transmits information (job abort information) indicating that execution of the job was aborted to the Web server 201 in step S312. In this way, the Web browser 203 reports to the Web server 201 that the service provider 204 controlled execution of the job according to the instruction in step S310. Upon reception of the job abort information as a report, the Web server 201 saves the received information as a log and returns a response to the Web browser 203 in step S314. Note that when the Web browser 203 cannot establish a communication with the Web server 201 in step S312, it may repetitively transmit report information until it can establish a communication with the Web server 201 as in step S414 in FIG. 4 (to be described later).

As described above, when a specific instruction is input via the operation screen related to a job during execution of the job by the service provider 204, the Web browser 203 instructs the service provider 204 to control the job according to that instruction without the intervention of the Web server 201. In this manner, when an instruction is input via the displayed operation screen and requires immediacy, execution of the job can be controlled without the intervention of the Web server 201 as needed. Note that the specific instruction may be an instruction associated with processing determined in advance as processing to be executed immediately. The user may set in advance arbitrary processing which is judged to be executed immediately as the specific processing in the device 10 (Web browser 203) or Web server 201. When the specific instruction is set in advance in the Web server 201, as will be described later, the Web browser 203 may be notified of that instruction attached to screen information.

FIG. 4 is a chart showing signal flows to be exchanged among the devices when processing corresponding to a modification of the processing described using FIG. 3 is executed. In FIG. 4, when the user inputs an instruction (print abort instruction) via an operation screen (print-in-progress screen) which is being displayed by the Web browser 203, the Web browser 203 transmits that instruction to the Web server 201 first unlike in step S310 in FIG. 3. In this case, when the Web browser 203 cannot establish a communication with the Web server 201 and determines that the instruction cannot be received by the Web server 201, it transmits the instruction to the service provider 204 without the intervention of the Web server 201. In this way, when the input instruction cannot be received by the Web server 201 due to, for example, a network delay, a long time period may be required until control of the job according to that instruction is started. In this case, the Web browser 203 judges that the instruction is to be executed immediately, and instructs the service provider 204 to control the job according to the instruction without the intervention of the Web server 201, as shown in FIG. 4. Note that steps S402 to S408 are the same as steps S302 to S308 in FIG. 3, and a repetitive description will be avoided as much as possible.

Upon reception of the screen information of the print-in-progress screen from the Web server 201, the Web browser 203 displays the print-in-progress screen based on the received screen information during execution of print processing in step S408. When the user presses the "abort" button during display of the print-in-progress screen, the Web browser 203 transmits the job ID of the job, execution of which is to be aborted, and a print abort instruction to the Web server 201 first in step S410. However, assume that in FIG. 4, a communication cannot be established between the Web browser 203 and Web server 201, and the job ID and print abort instruction cannot be received by the Web browser 201 in step S410.

Upon transmitting the job ID and print abort instruction to the Web server 201, when the Web server 203 determines that a communication with the Web server 201 cannot be established, and these pieces of information cannot be received by the Web server 201, it executes processing to be described below. That is, when the Web browser 203 determines that the print abort instruction is an instruction to be executed immediately without the intervention of the Web server 201, it instructs the service provider 204 to control the job according to that instruction without the intervention of the Web server 201. More specifically, the Web browser 203 transmits the job ID of the job, execution of which is to be aborted, and a print abort instruction to the service provider 204 in step S412. Upon reception of the print abort instruction, the service provider 204 aborts execution of the print-in-progress job corresponding to the job ID.

After the Web browser 203 transmits the print abort instruction to the service provider 204, it transmits job abort information as a report to the Web server 201. In this case, when a communication with the Web server 201 cannot be established, the Web browser 203 repetitively transmits the job abort information in step S414 until a communication with the Web server 201 can be established. Thus, the Web browser 203 allows the Web server 201 to surely receive the report.

After a communication between the Web browser 203 and Web server 201 is established (recovered), the Web server 201 receives the job abort information in step S416. As a result, the Web server 201 saves the job abort information as a log, and returns a response to the Web browser 203 in step S418.

As described above, when the user inputs an instruction via an operation screen related to a job which is being executed, the Web browser 203 of the device (image processing apparatus) 10 determines whether or not a predetermined condition is satisfied. In this case, the predetermined condition may include, for example, a condition as to whether or not the instruction is a specific instruction (FIG. 3), or a condition as to whether or not a communication between the Web browser 203 and Web server 201 cannot be established and the instruction cannot be received by the Web server (FIG. 4). That is, the predetermined condition is used as a criterion upon determining whether or not an instruction input via the operation screen is to be executed immediately. In this manner, when immediacy is required, execution of the job can be quickly controlled according to the instruction without the intervention of the Web server 201.

Figure 5A:
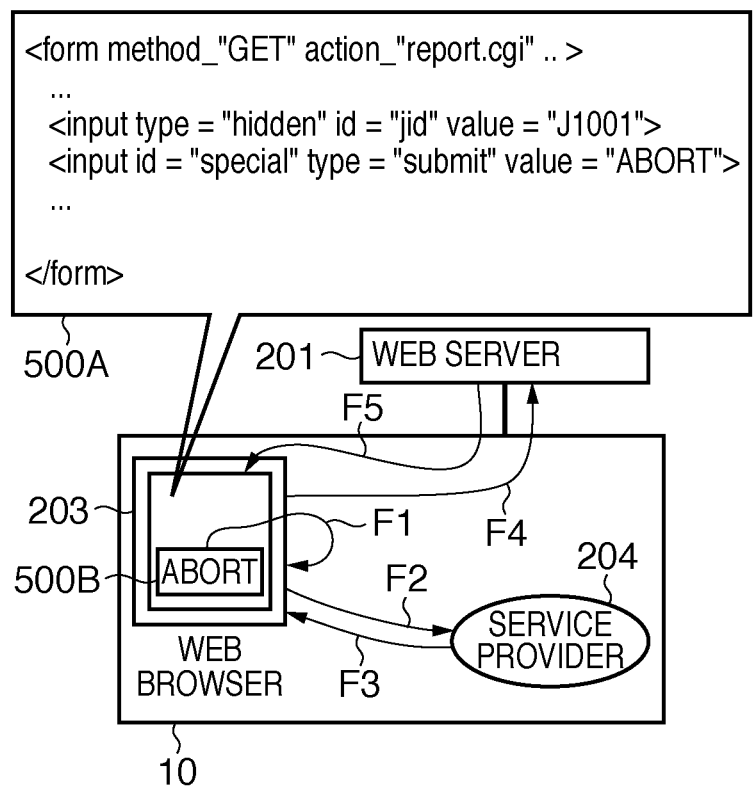
FIGS. 5A and 5B are respectively a view showing an overview of a mechanism for aborting a print job without the intervention of the Web server 201 and a flowchart showing the sequence of operations to be executed.
Figure 5B:
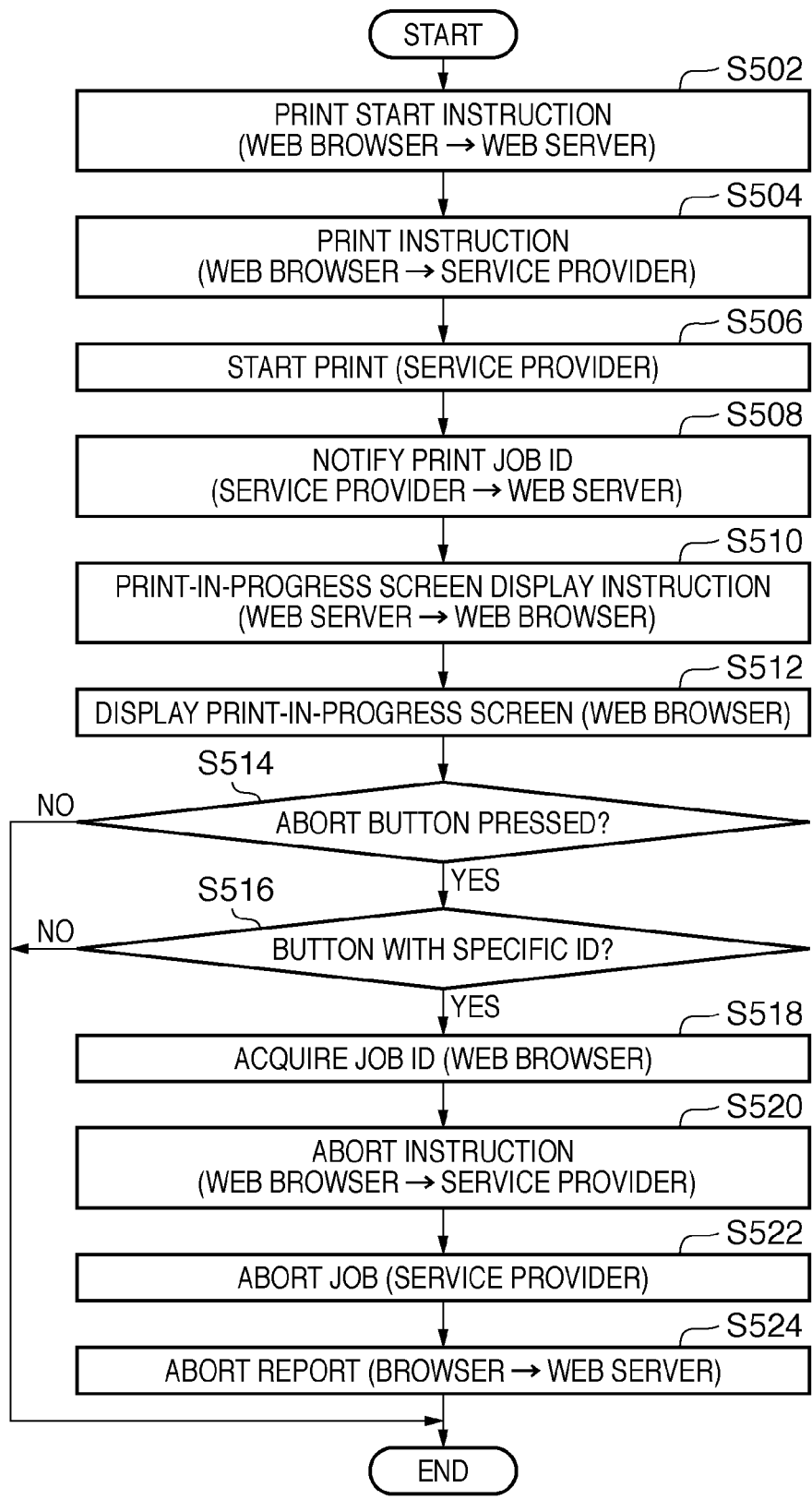

The aforementioned processing will be explained more practically taking as an example a case in which the Web browser 203 aborts a print job without the intervention of the Web server 201. FIGS. 5A and 5B are respectively a view showing an overview of a mechanism for aborting a print job without the intervention of the Web server 201, and a flowchart showing the sequence of operations to be executed. A script 500A shows the concept of a script used in the operations shown in the flowchart of FIG. 5B.

In this case, assume that screen information which is received from the Web server 201 by the Web browser 203 includes information of a button 500B attached with a specific ID. This information of the button 500B is used when a button used to input a job abort instruction corresponding to a specific instruction associated with processing that requires immediacy is displayed in an operation screen. In this manner, in the example shown in FIGS. 5A and 5B, the Web browser 203 is notified of the specific instruction attached to the screen information. When the user presses the button 500B included in the operation screen during execution of a job, the Web browser 203 directly sends a job abort instruction to the service provider 204. In this example, assume that the Web browser 203 is set in advance to perform such operation. Note that the Web server 201 transmits, to the Web browser 203, the screen information which also includes a job ID of the job which is being executed by the service provider 204. The Web browser 203 sends the job ID included in the received screen information to the service provider 204 together with the job abort instruction.

When the user makes a print start operation using a screen displayed on the Web browser 203, the Web browser 203 transmits a print start instruction to the Web server 201 in step S502. Upon reception of the print start instruction, the Web server 201 transmits a print instruction to the service provider 204 in step S504.

Upon reception of the print instruction from the Web server 201, the service provider 204 generates a print job required to execute processing according to the received instruction, and starts print processing based on the generated print job in step S506. Note that the service provider 204 issues a job ID required to identify the generated job when it generates the print job. In step S508, the service provider 204 transmits the job ID of the print job to the Web server 201. Upon reception of the job ID of the print job from the service provider 204, the Web server 201 transmits screen information (script 500A) required to display a print-in-progress screen including the job ID to the Web browser 203 in step S510.

Upon reception of the screen information from the Web server 201, the Web browser 203 displays a print-in-progress screen in step S512. In this case, as an example of a notification method of the job ID, a method of attaching the job ID as a "hidden" element to the screen information (script 500A), thereby allowing the Web server 201 to notify the Web browser 203 of the job ID, as shown in FIG. 5A, is assumed.

The Web browser 203 determines in step S514 whether or not the user has pressed the print abort button 500B used to instruct to abort execution of the print job during display of the print-in-progress screen. If the user has not pressed the print abort button 500B, the Web browser 203 keeps displaying that screen until the print processing ends.

On the other hand, if the user has pressed the print abort button, the Web browser 203 acquires the job ID of the print job which is being executed from the screen information corresponding to the print-in-progress screen (F1) in step S516. In step S518, the Web browser 203 transmits a print abort instruction including the acquired job ID to the service provider 204 (F2). Upon reception of the print abort instruction in step S520, the service provider 204 aborts execution of the print-in-progress job, which is specified based on the job ID included in the instruction, in step S522. In this case, the service provider 204 notifies the Web browser 203 that execution of the job is aborted based on the print abort instruction (F3).

In this case, in the script 500A corresponding to the screen information, a URL required to execute processing for reporting to the Web server 201 that the print processing is aborted is designated in an "action" attribute of a <form> tag corresponding to information of the print-in-progress screen. With this URL, the Web browser 203 executes print abort reporting processing to the Web server 201 together with the print job abort instruction (S522) in response to pressing of the print abort button 500B (F4) in step S524.

As described above, according to FIGS. 5A and 5B, the screen information received from the Web server 201 includes information of the button 500B with a specific ID attached. When the user presses the button displayed based on that information, the Web browser 203 can directly issue a job abort instruction to the service provider 204 without the intervention of the Web server 201. In this way, the processing that requires immediacy can be quickly executed without the intervention of the Web server 201.

<Second Embodiment>

Figure 6B:
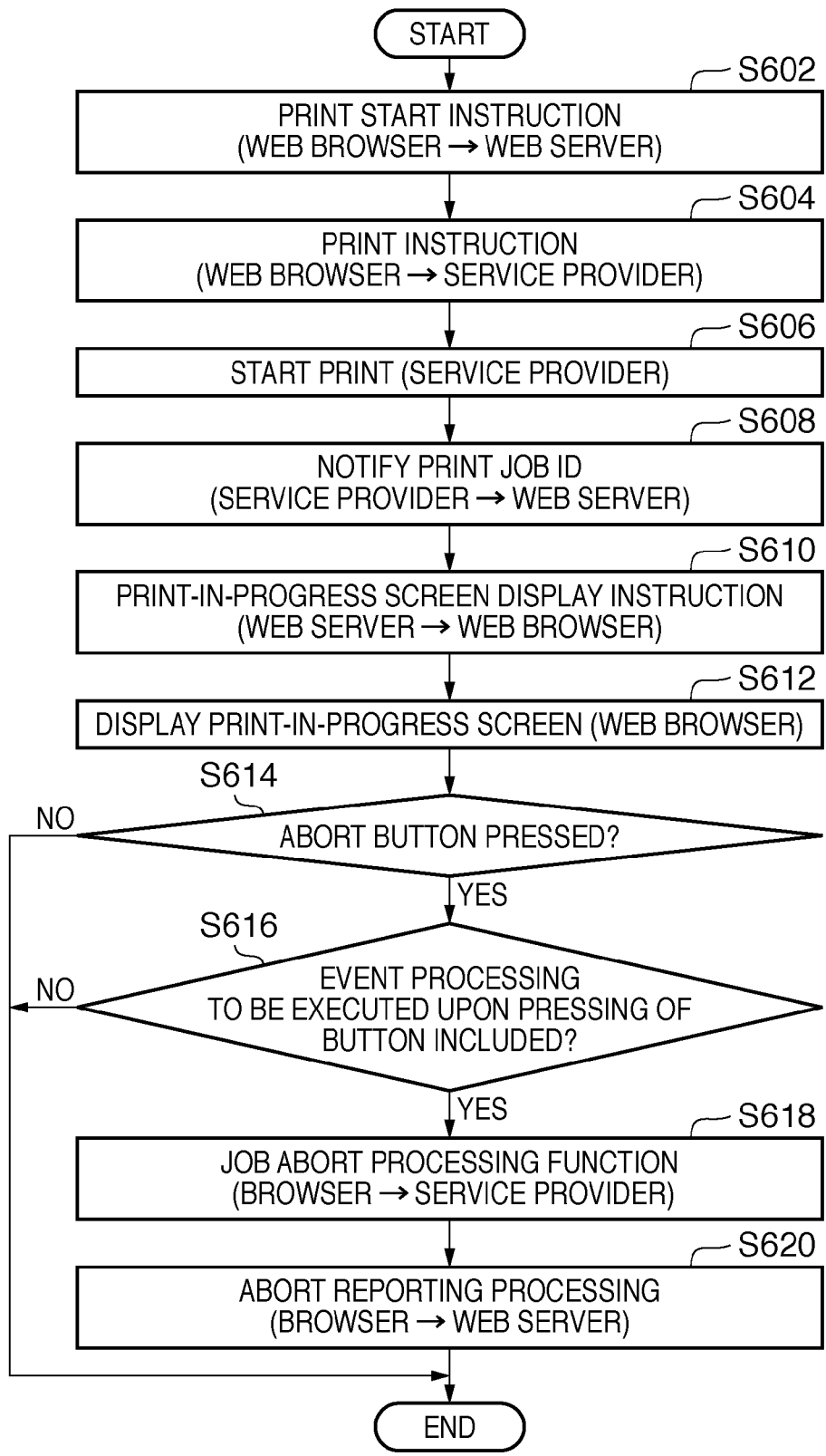

FIGS. 6A and 6B are respectively a view showing an overview of a mechanism for aborting a print job without the intervention of the Web server 201, and a flowchart showing the sequence of operations to be executed, when a Document Object Model (to be referred to as "DOM" hereinafter) is used according to the second embodiment. A DOM is available as an object model which is required to handle a structure of a document described using a markup language such as HTML as an object. The DOM defines a logical structure of a document, accesses to the document, and an operation method. For example, a "device object" has an attribute "printer", which refers to an instance of a printer unit class.

Using this method, an apparatus and job can be controlled based on a script via an interface of an apparatus object model. By combining a DOM and operations for an apparatus object model using a script embedded in an HTML document, a user interface of apparatus control can be described using an HTML and script 600A.

In this embodiment, when the user presses an "abort" button 600B displayed by the Web browser 203, a "JobStop" function of a "printer" object is executed by tracing the "printer" object from the device object. At the same time, print abort reporting processing to the Web server 201 is executed.

Since steps S602 to S612 are the same as steps S502 to S512 in FIG. 5B, a description thereof will not be repeated. When the Web browser 203 begins to display a print-in-progress screen in step S612, it determines in step S614 whether or not the user has pressed the print abort button 600B during display of the print-in-progress screen. If the user has not pressed the print abort button 600B, the Web browser 203 keeps displaying that screen until the print processing ends.

On the other hand, if the user has pressed the print abort button 600B in step S614, the Web browser 203 determines in step S616 whether or not screen information corresponding to the print-in-progress screen includes event processing to be executed upon pressing of the print abort button 600B. If the Web browser 203 determines that the event processing to be executed upon pressing of the print abort button 600B is included, it executes that event processing in step S618. In this embodiment, the Web browser 203 executes the "JobStop" function of the "printer" object included in the script 600A shown in FIG. 6A. Furthermore, the Web browser 203 executes print abort reporting processing to the Web server 201 in step S620.

<Third Embodiment>

As an embedded object (API) used to make an HTTP communication with a server in a script language such as a Java® script or ECMA script, which is embedded in a Web browser, an XMLHttpRequest object is available. The third embodiment will exemplify a case in which an HTTP request is further issued from an already loaded page using this XMLHttpRequest object.

FIGS. 7A, 7B, and 7C are respectively views (scripts 700A and 700B) showing an overview of a mechanism for aborting a print job without the intervention of the Web server 201, and a flowchart showing the sequence of operations to be executed, when an XMLHttpRequest is used according to the third embodiment. FIG. 7A shows a basic example of a script 700A including the XMLHttpRequest object. Based on the script 700A shown in FIG. 7A, in this embodiment, an XMLHttpRequest object is generated for each Web browser 203. In the script 700A, a function "check()" is set in an "onreadystatechange" property so as to designate processing after a response to the XMLHttpRequest is received from the server.

Next, according to the script 700A, a request is generated by an "open()" method of the XMLHttpRequest object, and is transmitted by a "send()" method. The function designated in the "onreadystatechange" property checks a request processing status and communication error based on values of "readyState" and "status" properties. When a normal response is returned, a callback function described in an "if" statement required to judge a request processing status and communication error is executed.

In this embodiment, the Web browser 203 issues a job abort processing request to a local loopback address by the "open" method, and executes abort reporting processing to the Web server 201 as processing to be executed when a response is returned. Note that a cross-domain communication method is not particularly limited.

Next, an HTML script 700B shown in FIG. 7B is an example of an HTML script which includes a script required to execute job abort processing and abort reporting processing. Processing executed when the user presses an abort button 700C displayed by the Web browser 203 is executed according to the script which is included in the HTML script 700B and is related to the job abort processing and abort reporting processing.

Since steps S702 to S712 are the same as steps S502 to S512 in FIG. 5B, a description thereof will not be repeated. When the Web browser 203 displays a print-in-progress screen in step S712, it determines in step S714 whether or not the user has pressed the print abort button 700C during display of the print-in-progress screen. If the user has not pressed the print abort button 700C, the Web browser 203 keeps displaying that screen until the print processing ends.

On the other hand, if the user has pressed the print abort button 700C in step S714, the Web browser 203 determines in step S716 whether or not processing to be executed upon pressing of the print abort button 700C is described. If the Web browser 203 determines that processing to be executed upon pressing of the print abort button 700C is described, it executes processing to be described below. In step S718, the Web browser 203 transmits a request to abort the job to a local loopback address. When the service provider 204 receives the request transmitted to the local loopback address, it executes job abort processing in step S720.

After that, the Web browser 203 checks a processing status of the request and a communication error in step S722 after transmission of the job abort request in step S718. The Web browser 203 determines in step S724 based on the checking result in step S722 whether or not a normal response to that request is returned. If the Web browser 203 determines that a normal response is not returned, it repeats the processes in steps S722 and S724. On the other hand, if the Web browser 203 determines that a normal response is returned, it executes a function for abort reporting processing designated in the callback function in step S726. As a result, the Web browser 203 reports to the Web server 201 about abort of the print job.

According to this embodiment, since an instruction associated with processing that requires immediacy can be issued without the intervention of the Web server 201, desired processing can be quickly executed without being influenced by a network delay.

<Fourth Embodiment>

Figure 8A:
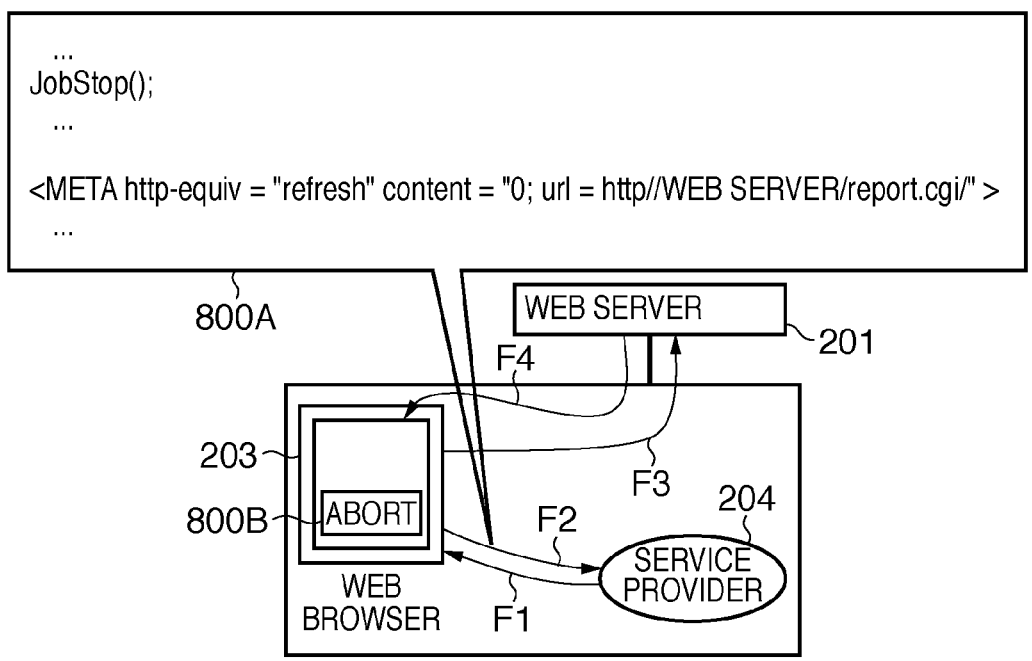
FIGS. 8A and 8B are respectively a view showing an overview of a mechanism for aborting a print job without the intervention of the Web server 201, and a flowchart showing the sequence of operations to be executed, when a response to a print abort instruction is transferred.
Figure 8B:
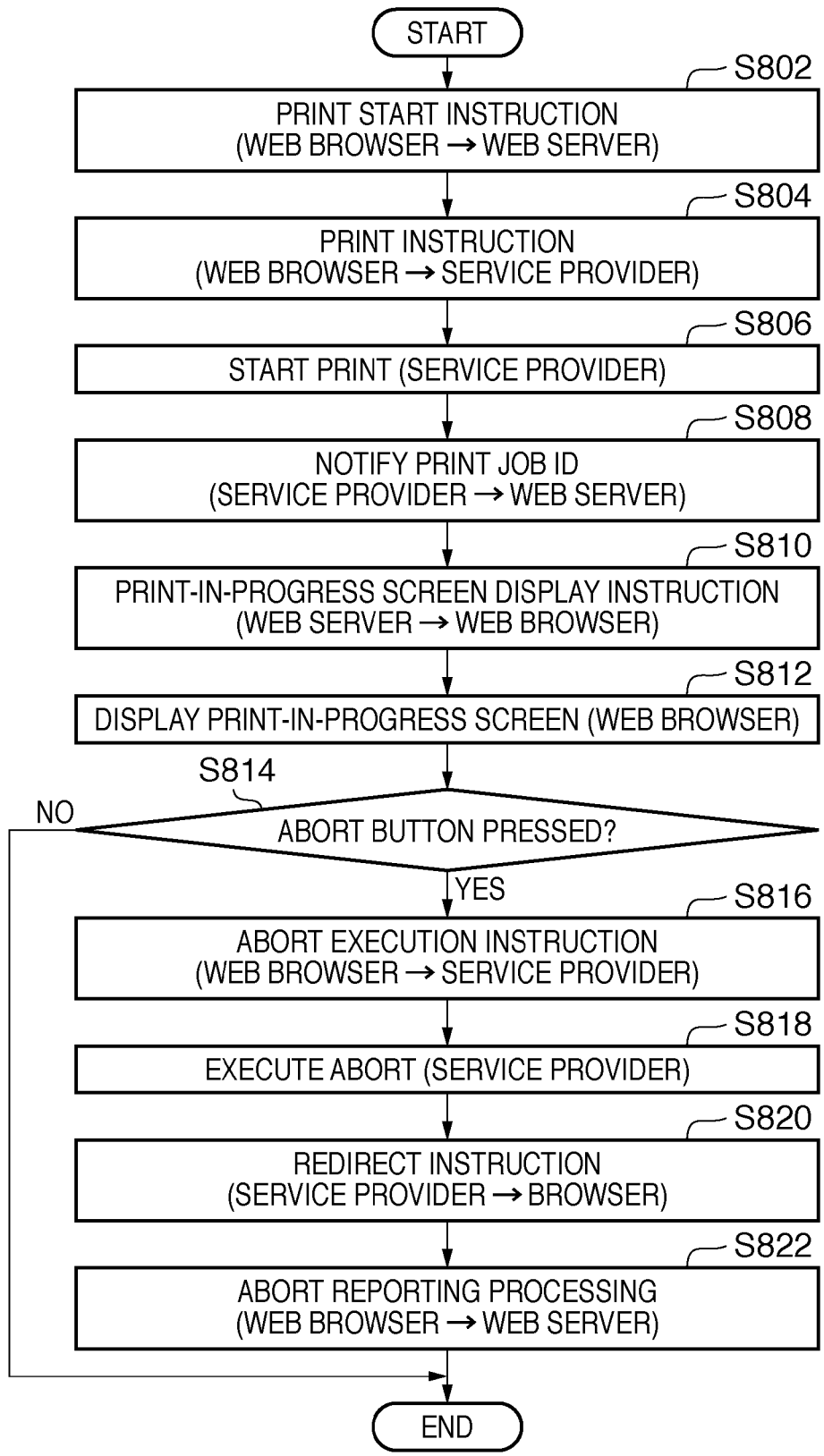

FIGS. 8A and 8B are respectively a view showing an overview of a mechanism for aborting a print job without the intervention of the Web server 201, and a flowchart showing the sequence of operations to be executed, when a response to a print abort instruction is transferred to the Web server 201 side according to the fourth embodiment. In this embodiment, when the user presses a print job abort button 800B, the Web browser 203 transmits a request including a print abort instruction to the service provider 204. Upon reception of the request including the print abort instruction, the service provider 204 aborts execution of a print job, and transmits, to the Web browser 203, a response used to notify that execution of the print job is aborted. In this embodiment, the service provider 204 transmits this response including a transfer instruction to the Web server 201. With this instruction, the Web browser 203 executes print abort reporting processing to the Web server 201. Note that the aforementioned operations are described in a script 800A. Since steps S802 to S812 are the same as steps S502 to S512 in FIG. 5B, a description thereof will not be repeated.

When the Web browser 203 displays a print-in-progress screen in step S812, it determines in step S814 whether or not the user has pressed the print abort button 800B during display of the print-in-progress screen. If the user has not pressed the print abort button 800B, the Web browser 203 keeps displaying that screen until the print processing ends.

On the other hand, if the user has pressed the print abort button 800B in step S814, the Web browser 203 transmits a request including a print abort instruction to the service provider 204 in step S816. Upon reception of the request including the print abort instruction, the service provider 204 executes processing for aborting execution of a print job according to the instruction in step S818. After that, the service provider 204 transmits, to the Web browser 203, a response including a transfer (redirect) instruction to a print abort reporting URL to the Web server 201 in step S820.

Based on the transfer instruction included in the response from the service provider 204, the Web browser 203 executes print job abort reporting processing to the Web server 201 in step S822. In this case, a transfer destination is designated using a <meta> tag, as described in the script 800A, but the transfer method is not limited to such specific method.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-138645, filed Jun. 17, 2010 and 2011-112900, filed May 19, 2011, which are hereby incorporated by reference herein in their entirety.

What is claimed is:

1. An image processing apparatus configured to communicate with a Web server which provides screen information for displaying an operation screen on the image processing apparatus and which transmits an execution request of processing corresponding to input information input via the operation screen to the image processing apparatus, said apparatus comprising:

a processor coupled to a memory and programmed to function as:

a display control unit that displays the operation screen based on the screen information provided by the Web server, and that transmits input information input via the operation screen to the Web server; and an execution control unit that executes, upon reception from the Web server of the execution request corresponding to the input information transmitted from said display control unit to the Web server, a job according to the execution request, and that notifies the Web server of a job ID which identifies that job, wherein said display control unit includes:

a receiver that receives, from the Web server, screen information of an operation screen related to the job being executed on the image processing apparatus together with the job ID which identifies the job being executed, in response to the notification of the job ID by said execution control unit;

a determination unit that determines whether or not a predetermined condition is satisfied when an instruction related to the job is input via the operation screen displayed based on the received screen information during the execution of the job;

a transmission unit that transmits the input instruction to the Web server so that said execution control unit controls the execution of the job in accordance with a request to be received from the Web server, in a case where said determination unit has determined that the predetermined condition is not satisfied; and an instruction unit that directly instructs, without intervention of the Web server, said execution control unit to control the execution of the job identified by the job ID in accordance with the input instruction, in a case where said determination unit has determined that the predetermined condition is satisfied.

2. The apparatus according to claim 1, wherein the predetermined condition includes a condition as to whether or not the instruction input via the operation screen displayed based on the received screen information is a specific instruction related to the job being executed.

3. The apparatus according to claim 2, wherein the specific instruction is an instruction related to processing which is determined in advance as processing to be executed immediately.

4. The apparatus according to claim 2, wherein the specific instruction is communicated from the Web server by information attached to the screen information received by said receiver together with the job ID.

5. The apparatus according to claim 2, wherein
the job is a print job,
the specific instruction is an instruction to abort execution of the print job, and
said execution control unit aborts execution of the print job identified by the job ID according to the specific instruction from said instruction unit.

6. The apparatus according to claim 1,
wherein when the instruction is input via the operation screen displayed based on the received screen information during the execution of the job, said display control unit transmits the instruction to the Web server as the input information,
wherein the predetermined condition includes a condition as to whether or not a communication with the Web server is established so that the Web server can receive the instruction transmitted by said display control unit.

7. The apparatus according to claim 1, wherein said display control unit further comprises a reporting unit that reports to the Web server regarding execution of control according to the instruction after said execution control unit controls execution of the job according to the instruction by said instruction unit.

8. The apparatus according to claim 7, wherein when a communication with the Web server is not established, said reporting unit repeats reporting until a communication with the Web server is established.

9. A control method of an image processing apparatus, which is configured to communicate with a Web server which provides screen information for displaying an operation screen on the image processing apparatus and which transmits an execution request of processing corresponding to input information input via the operation screen to the image processing apparatus, the image processing apparatus comprising: a display control unit that displays the operation screen based on the screen information provided by the Web server, and that transmits input information input via the operation screen to the Web server; and an execution control unit that executes, upon reception from the Web server of the execution request corresponding to the input information transmitted from the display control unit to the Web server, a job according to the execution request, said method comprising:
the execution control unit notifying the Web server of a job ID which identifies that job;
the display control unit receiving, from the Web server, screen information of an operation screen related to the job being executed on the image processing apparatus together with the job ID which identifies the job being executed, in response to the notification of the job ID in the notifying step;
the display control unit determining whether or not a predetermined condition is satisfied when an instruction related to the job is input via the operation screen displayed based on the received screen information during the execution of the job;
the display control unit transmitting the input instruction to the Web server so that said execution control unit controls the execution of the job in accordance with a request to be received from the Web server, in a case where it has been determined in the determining step that the predetermined condition is not satisfied; and
the display control unit directly instructing, without intervention of the Web server, the execution control unit to control the execution of the job identified by the job ID in accordance with the input instruction, in a case where it has been determined in the determining step that the predetermined condition is satisfied.

10. A non-transitory computer-readable storage medium storing a program that when executed causes a computer to perform a control method of an image processing apparatus, which is configured to communicate with a Web server which provides screen information for displaying an operation screen on the image processing apparatus and which transmits an execution request of processing corresponding to input information input via the operation screen to the image processing apparatus, the image processing apparatus comprising: a display control unit that displays the operation screen based on the screen information provided by the Web server, and that transmits input information input via the operation screen to the Web server; and an execution control unit that executes, upon reception from the Web server of the execution request corresponding to the input information transmitted from the display control unit to the Web server, a job according to the execution request, said method comprising:
the execution control unit notifying the Web server of a job ID which identifies a job execution of which is started on the image processing apparatus;
the display control unit receiving, from the Web server, screen information of an operation screen related to the job being executed on the image processing apparatus together with the job ID which identifies the job being executed, in response to the notification of the job ID in the notifying step;
the display control unit determining whether or not a predetermined condition is satisfied when an instruction related to the job is input via the operation screen displayed based on the received screen information during the execution of the job;
the display control unit transmitting the input instruction to the Web server so that said execution control unit controls the execution of the job in accordance with a request to be received from the Web server, in a case where it has been determined in the determining step that the predetermined condition is not satisfied; and
the display control unit directly instructing, without intervention of the Web server, the execution control unit to control the execution of the job identified by the job ID in accordance with the input instruction, in a case where it has been determined in the determining step that the predetermined condition is satisfied.

\* \* \* \* \*